United States Patent
Khan et al.

(10) Patent No.: US 12,271,260 B2
(45) Date of Patent: Apr. 8, 2025

(54) METHOD TO RETRIEVE TRANSACTION ADDRESS RESULTING IN AN UNCORRECTABLE PCIe ERROR

(71) Applicant: NXP USA, Inc., Austin, TX (US)

(72) Inventors: Wasim Khan, Kanpur (IN); Prabhjot Singh, Noida (IN); Deepak Kumar, Noida (IN); Varun Sethi, Noida (IN)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 18/328,927

(22) Filed: Jun. 5, 2023

(65) Prior Publication Data

US 2024/0168842 A1    May 23, 2024

(30) Foreign Application Priority Data

Nov. 18, 2022  (IN)  ............... 202211066158

(51) Int. Cl.
*G06F 11/07* (2006.01)

(52) U.S. Cl.
CPC ...... *G06F 11/0793* (2013.01); *G06F 11/0745* (2013.01)

(58) Field of Classification Search
CPC ............. G06F 11/0793; G06F 11/0745; G06F 13/4291
See application file for complete search history.

(56) References Cited

U.S. PATENT DOCUMENTS

| | | | | |
|---|---|---|---|---|
| 6,625,683 B1 * | 9/2003 | Khan | ................ | G06F 13/4027 |
| | | | | 710/313 |
| 7,389,379 B1 * | 6/2008 | Goel | ................ | G06F 11/1662 |
| | | | | 714/6.32 |
| 8,959,288 B1 * | 2/2015 | de la Iglesia | ....... | G06F 12/0207 |
| | | | | 711/E12.002 |
| 9,170,911 B1 * | 10/2015 | Atsatt | ................ | G06F 11/0751 |
| 11,048,569 B1 * | 6/2021 | Seshadri | ............... | G06F 11/324 |
| 11,175,977 B2 | 11/2021 | Kumar et al. | | |
| 2006/0277444 A1 * | 12/2006 | Holian | ............... | G06F 11/0745 |
| | | | | 714/41 |
| 2012/0265910 A1 * | 10/2012 | Galles | ................ | G06F 11/2005 |
| | | | | 710/300 |
| 2015/0100709 A1 * | 4/2015 | Nanduri | ................ | G06F 13/28 |
| | | | | 710/22 |
| 2015/0281044 A1 | 10/2015 | Kugata | | |
| 2015/0370683 A1 | 12/2015 | Nishiyama et al. | | |

(Continued)

OTHER PUBLICATIONS

Anonymous, "Intel Data Streaming Accelerator Architecture Specification", Sep. 1, 2022, XP093004343, pp. 57, 217.

(Continued)

*Primary Examiner* — Matthew M Kim
*Assistant Examiner* — Matthew N Putaraksa (57) ABSTRACT

A method to retrieve transaction address resulting in PCIe completion timeout includes monitoring a Peripheral Component Interconnect Express (PCIe) controller to detect a Completion Timeout (CTO) transmitted therefrom. A Master Identification (ID) of a Master and a transaction address of a transaction are stored in a configuration space, in response to detecting the CTO, wherein the transaction originates from the Master and the CTO is signaled in response to the transaction. The CTO is responded to with the Master identified by the Master ID in the configuration space.

20 Claims, 9 Drawing Sheets

(56) References Cited

U.S. PATENT DOCUMENTS

| | | | | |
|---|---|---|---|---|
| 2020/0204620 | A1* | 6/2020 | Troy | G06F 11/0793 |
| 2021/0103391 | A1* | 4/2021 | Wolter | G06F 11/076 |
| 2022/0199144 | A1* | 6/2022 | Roberts | G11C 11/4078 |
| 2022/0327024 | A1* | 10/2022 | Jose | G06F 9/541 |
| 2024/0103971 | A1* | 3/2024 | Vishwanath | G06F 8/65 |

OTHER PUBLICATIONS

Intel, "F-Tile Avalon Streaming Intel FPGA IP for PCI Express User Guide," Section 3.5 Completion Timeout, 1 page.

* cited by examiner

METHOD TO RETRIEVE TRANSACTION ADDRESS RESULTING IN AN UNCORRECTABLE PCIe ERROR

CROSS-REFERENCE TO RELATED APPLICATIONS

This application claims the priority under 35 U.S.C. § 119 of India application Ser. No. 20/221,1066158, filed on 18 Nov. 2022, the contents of which are incorporated by reference herein.

FIELD

This disclosure relates generally to Peripheral Component Interconnect Express (PCIe), and more specifically to recovering from an error due to a PCIe transaction.

BACKGROUND

PCIe is a high-speed serial computer expansion bus standard, which facilitates the addition, automatic reconfiguration and networking of devices. Devices may be referred to as End Points (EP), which may share access to memories and various Master's (e.g., CPUs) via a Root Complex, (which may further comprise at least part of the PCIe controller). The Root Complex communicates to each Master though links (also referred to as interconnect).

When a Master communicates with a PCIe EP, a packet is constructed with a transaction layer, appended by a data link layer, further appended by a physical (PHY) layer. Handshaking occurs between a Requester (e.g., the Master) and a Completer (e.g., the PCIe EP). Additional handshaking may occur at intermediate steps, including between the Master and PCIe controller, and between the PCIe controller and the PCIe EP. In one example, if the Master issues a read non-posted request to the PCIe EP via the constructed packet, and the PCIe EP fails to timely respond to this request, a Completion Timeout (CTO) is issued by the PCIe controller. The CTO will cause an Advanced Extensible Interface (AXI) error on an AXI bus, which may be treated as a System Error (SError) by a Master, in particular a Master implemented with an Advanced Reduced Instruction Set Computer Machine (ARM) core. An SError will cause the ARM core to print a memory stack and cause an entire system to go offline, with no information available to the user or system developer as to which transaction address caused the CTO, or which Master issued the transaction.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments described herein provide for a PCIe configuration space capability CTOR to store a CTO address of a transaction and a Master ID of the Master, which issued the transaction. If CTOR is enabled, the PCIe controller may store the CTO address along with the Master ID in a CTOR FIFO. This information may then be used to identify the transaction causing the CTO and then avoid these accesses or gracefully terminated the application associated with the transaction, without causing a complete system failure. The CTOR may also include reporting of additional error conditions that may facilitate reproducing the error causing the CTO in specific environments or setups that are hard to reproduce. Furthermore, the methods described herein may be applied to any CPU architecture (in addition to the ARM core)

Figure 1:
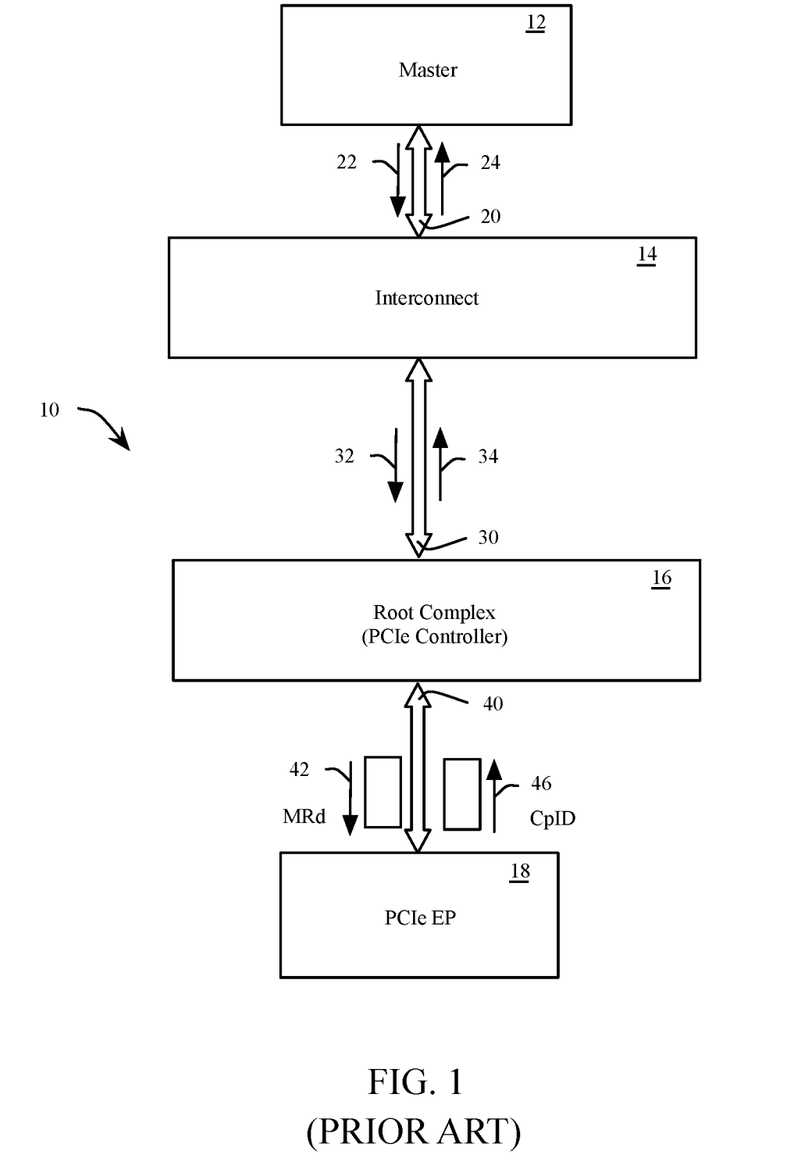
FIG. 1 is a functional block view of an embodiment of a PCIe system showing a successful read transaction with a PCIe EP.

FIG. 1 shows an example of a PCIe system 10, completing a successful read transaction. The PCIe system 10 includes a Master 12 an Interconnect (or link) 14, a Root Complex (or PCIe Controller) 16 and a PCIe EP 18. The Master 12 communicates with the Interconnect 14 as shown by transaction 20 in one example by issuing a memory read request (MRd) 22 and receiving an acknowledgment from the Interconnect 14 by way of a completion packet ID (CpID) 24. The Interconnect 14 subsequently communicates with the Root Complex 16 as shown by transaction 30 in one example by issuing a memory read request (MRd) 32 and receiving an acknowledgment from the Root Complex 16 by way of a completion packet ID (CpID) 34. The Root Complex 16 subsequently communicates with the PCIe EP 18 as shown by transaction 40 in one example by issuing a memory read request (MRd) 42 and receiving an acknowledgment form the PCIe EP 18 way of a completion packet ID (CpID) 46. FIG. 1 shows a successful read by a Master 12 on a PCIe EP 18 memory space, where the PCIe EP 18 will send completion data back to the Master 12 in a series of transmissions and handshakes with the Root Complex 16 and Interconnect 14.

Figure 2:
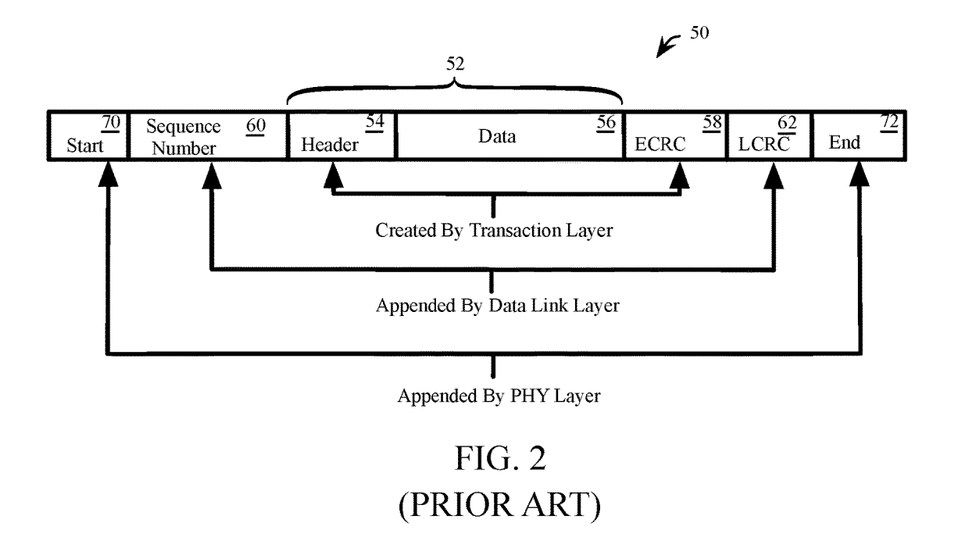
FIG. 2 is a schematic view of an embodiment of a data packet as received by the PCIe EP of FIG. 1.
Figure 3:
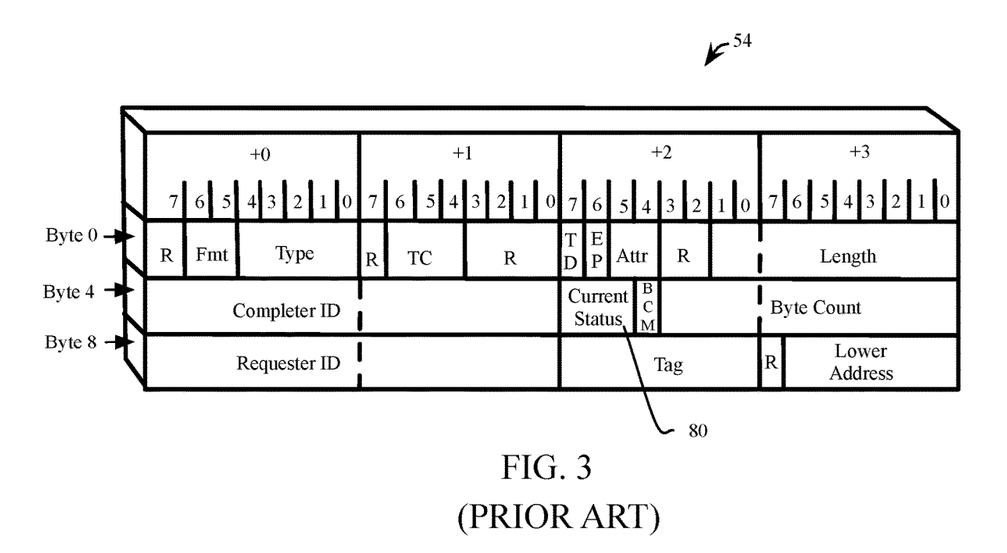
FIG. 3 is a schematic view of an embodiment of the header of the data packet of FIG. 2.

FIG. 2 shows an example construction of a transaction 50 (e.g., transaction 20, 30 or 40 from FIG. 1). The transaction 50 includes a core section 52 of a Transaction Layer Packet (TLP) from an application executed by a Master 12 (see FIG. 1). The TLP includes a header 54 and a data 56. A cyclical redundancy check (CRC) may also be added as an Error CRC (ECRC) 58. The transaction layer may be further encapsulated by a data link layer with a sequence number 60 and a Link CRC (LCRC) 62. Finally, a Physical (PHY) layer further encapsulates the encapsulated TLP with a start packet 70 and an end packet 72 to facilitate asynchronous communication of the transaction 50. FIG. 3 shows an example of the header 54 of FIG. 2. Specifically, the header 54 includes a current (or completion) status field 80 in Byte 6, bits 7:5 of the header 54. The current status field 80 may indicate a Successful Completion (SC) of a transaction, an Unsupported Request (UR), a Configuration Request Retry Status (CRS) or a Completer Abort (CA) for example, as an indication of a completion packet error. The current status field 80 may be returned as an acknowledgement to an MRd, shown as CpID 46, 34 or 24 in FIG. 1.

Figure 4:
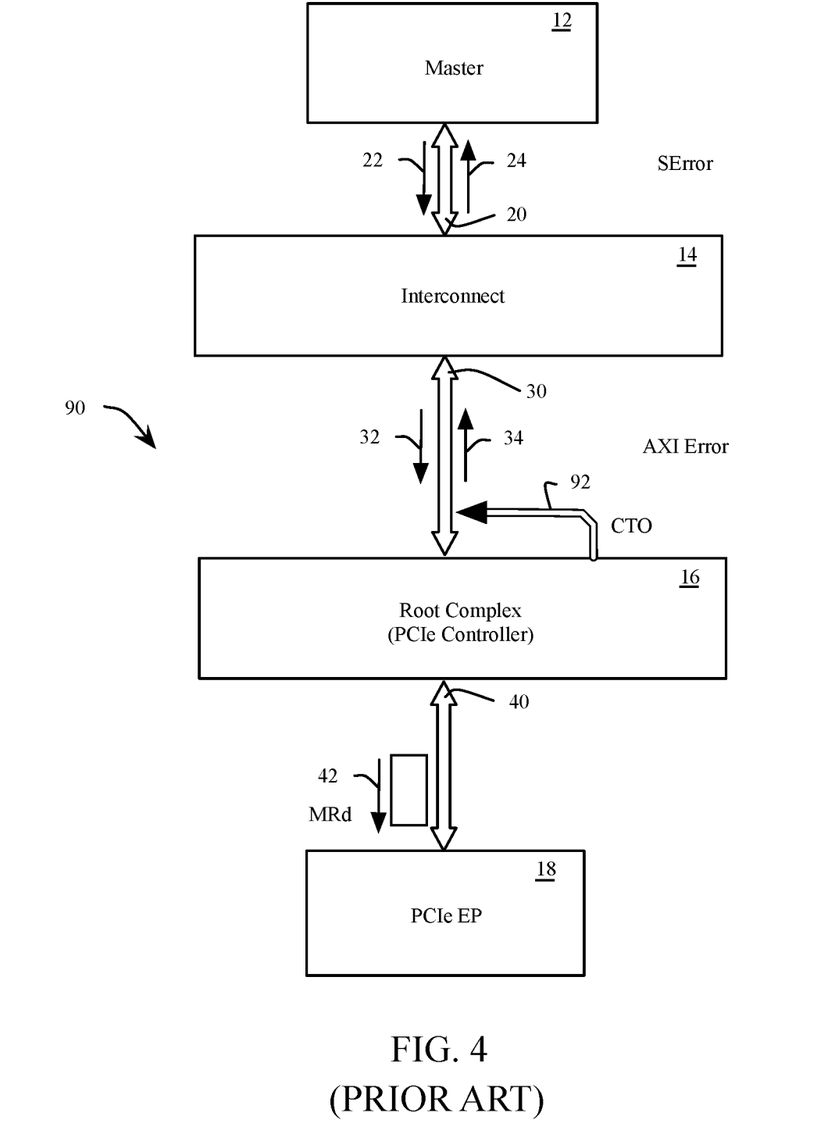
FIG. 4 is a functional block view of an embodiment of a PCIe system showing an unsuccessful read transaction with a PCIe EP, resulting in a CTO.

FIG. 4 with continued reference to FIG. 1 further illustrates a context within which the disclosed embodiments of the CTOR may be used. In contrast to FIG. 1, the PCIe system 90 does not receive a timely response from the PCIe EP 18 to a memory read request MRd 42, thus triggering a CTO 92 after a time duration (or timeout limit). The Root Complex 16 reports the CTO 92, which results in an AXI error on an AXI bus. This AXI bus error may be treated as a System Error (SError), particularly when the Master is implemented with an ARM core. Consequently, the PCIe system 90 may completely shut down (e.g. "crash") without knowledge of the offending transaction or Master from which it issued in the case of multiple Masters.

Figure 5:
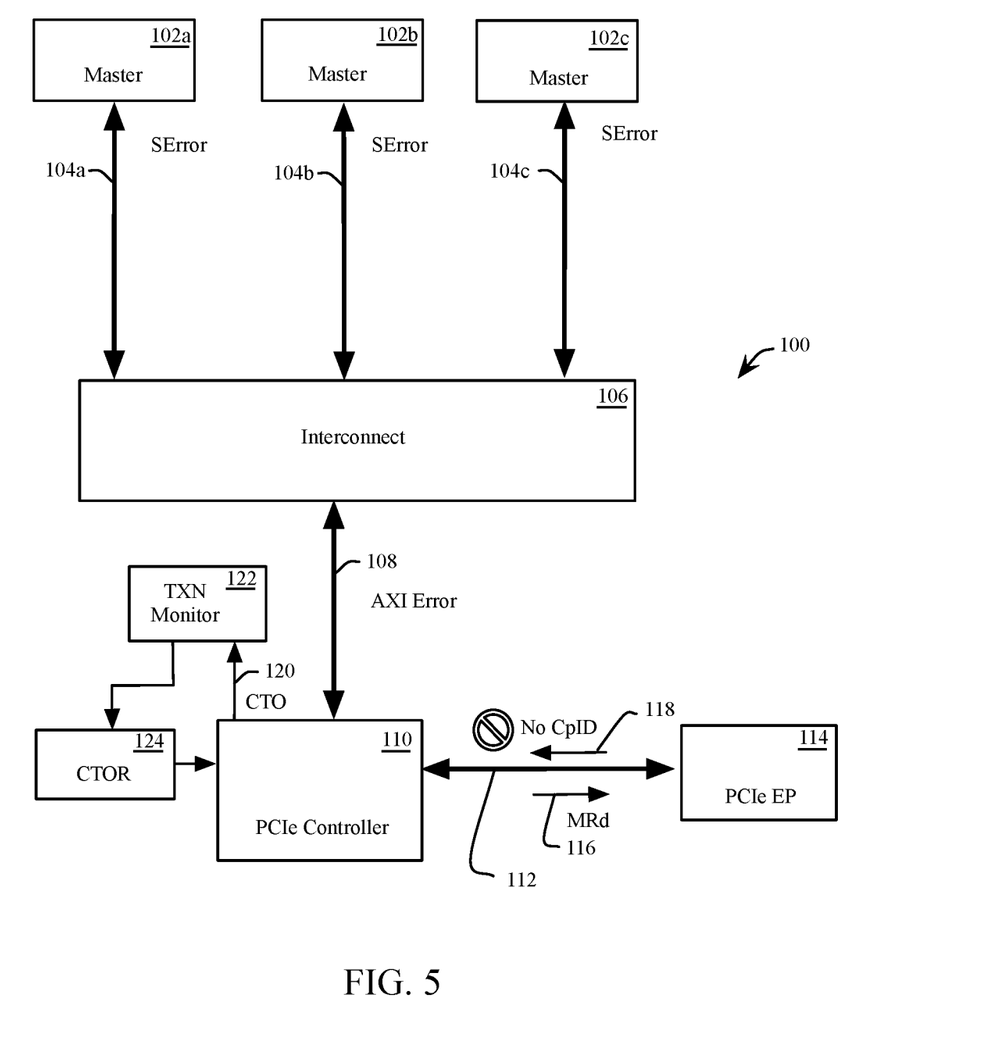
FIG. 5 is a functional block view of a PCIe system, in accordance with an embodiment of the present disclosure.

FIG. 5 shows a PCIe system 100, in accordance with an embodiment of the present disclosure. The system 100 includes a plurality of Masters 102a, 102b and 102c (generally 102). Each Master 102 communicates with the Interconnect 106 with a respective transaction 104a, 104b and 104c (generally 104). The Interconnect 106 communicates with a PCIe controller 110 with a transaction 108. Similarly, the PCIe controller 100 communicates with at least one PCIe EP 114 with a transaction 112. In one example, after a series of requests and acknowledgments between the Masters 102, Interconnect 106 and the PCIe controller 110, the TLP packet is issued by a respective Master 102 to the PCIe EP 114 as a memory read request 116. It should be understood that the MRd 116 is one of many packetized requests chosen for ease of illustration. In other embodiments, the TLP packet may be an IO Write Request (IOWr) for example. After a time limit is exceeded, if a CpID packet 118 is not issued by the PCIe EP 114, the CTO 120 is signaled by the PCIe Controller 110. In contrast to FIG. 4, the CTO 120 is monitored by a transmission monitor (TX Monitor) 122 and various error attributes, including but not limited to a Master ID of the Master that issued the offending transaction and a transaction address of the transaction, are stored in a CTOR 124. The stored error attributes are accessible by the PCIe controller 110, whose contents may be read by any Master 102 through a memory map.

Figure 6:
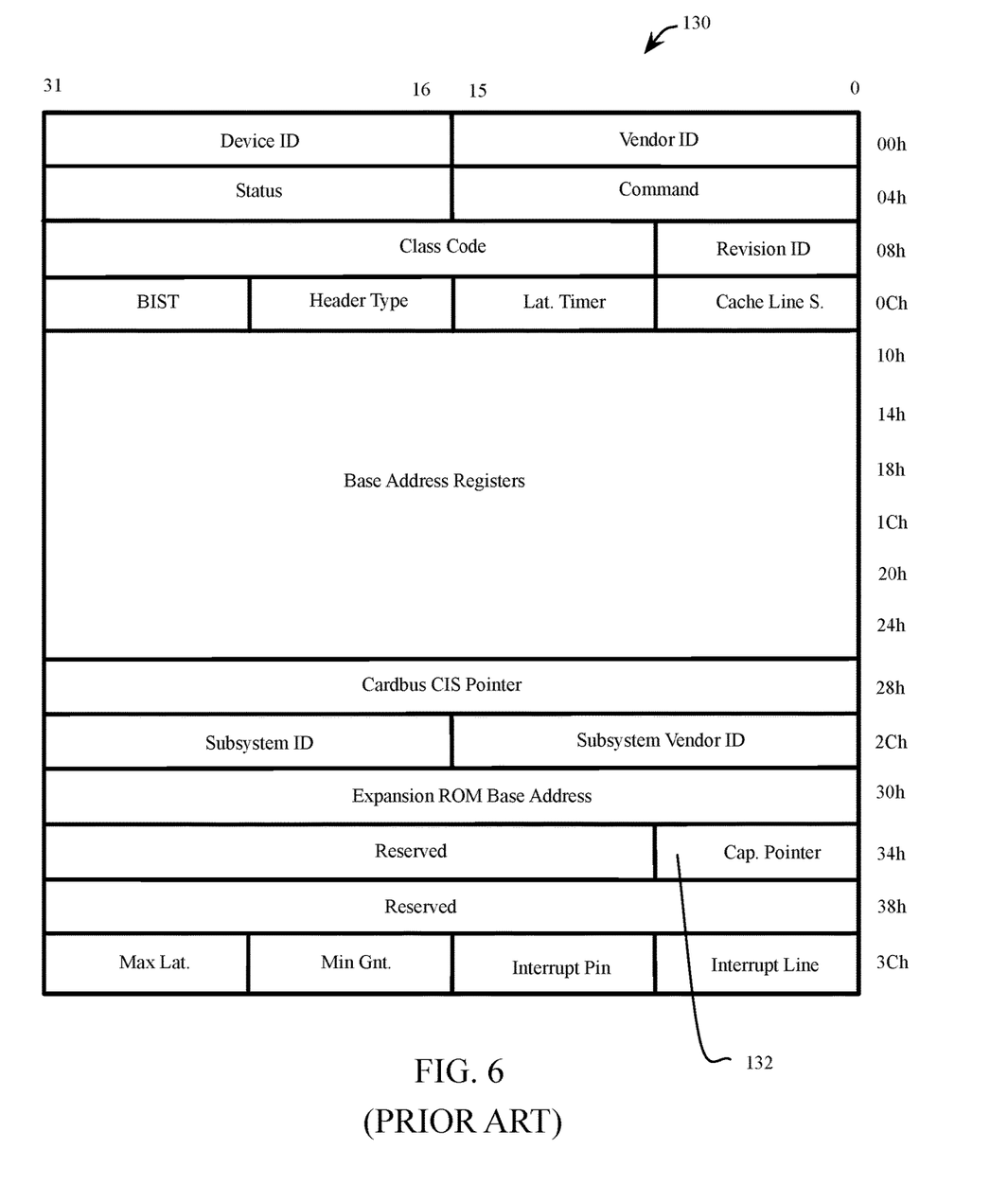
FIG. 6 is a schematic view of an embodiment of a configuration space header of a PCIe controller.
Figure 7:
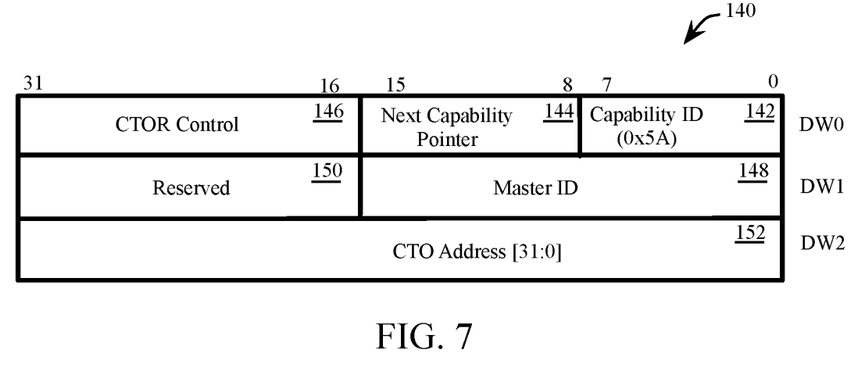
FIG. 7 is a schematic view of a data structure of a CTO Reporting (CTOR) capability with a 32-bit CTO address, in accordance with an embodiment of the present disclosure.
Figure 8:
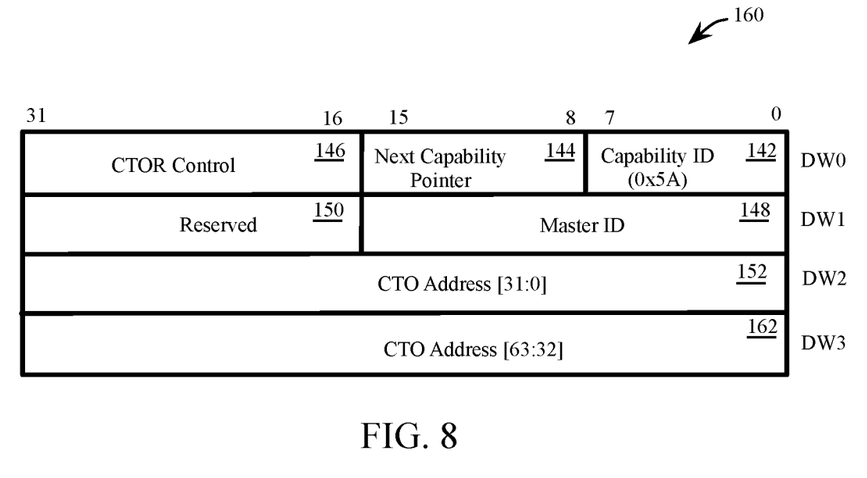
FIG. 8 is a schematic view of a data structure of a CTO Reporting (CTOR) capability with a 64-bit CTO address, in accordance with an embodiment of the present disclosure.

FIG. 6 shows an embodiment of a configuration space header 130 of a PCIe controller 110. The configuration space header 130 includes a capability pointer 132, which provides an address pointer to a plurality of capability pointers further described in FIG. 7 and FIG. 8. FIG. 7 shows a data structure of a configuration space 140 with CTOR capability, in accordance with an embodiment of the present disclosure. A first double word (DW0) (e.g., 32 bits), includes a Capability ID 142, linked to next capability pointer 144. The next capability pointer 144 is further linked to a next capability (e.g., a CTOR control register 146), thus forming a link list of capability pointers. In one example, the CTOR control register 146 may be part of the link list of DW0. A 16-bit field is allocated in DW1 to store the Master ID 148. In one embodiment, a second 16-bit field of DW1 is a reserved field 150. A 32-bit field of DW2 stores the CTO address 152 of the offending transaction. FIG. 8 shows a data structure of a configuration space 160 with CTOR capability, in accordance with an embodiment of the present disclosure. FIG. 8 is similar to FIG. 7 apart from an additional 32-bit field of DW3 to store an upper half of the CTO address 162, when a 64-bit addressing scheme is used.

Figure 9:
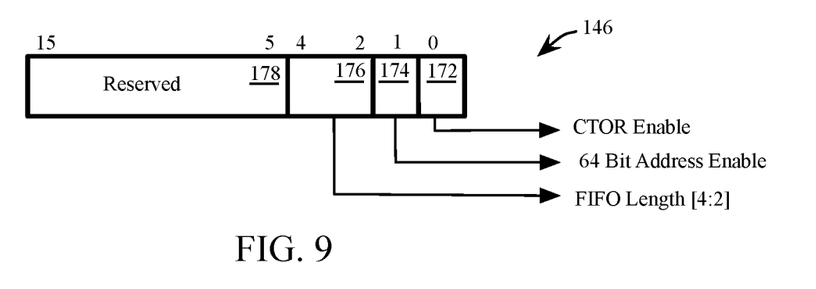
FIG. 9 is a schematic view of a data structure of a CTOR control register as shown in FIG. 7 and FIG. 8, in accordance with an embodiment of the present disclosure.

FIG. 9 shows a data structure of the CTOR control register 146 further shown in FIG. 7 and FIG. 8, in accordance with an embodiment of the present disclosure. The CTOR control register 146 may be scannable by the host software running on a Master 102. The first byte of the CTOR control register 146 stores a CTOR Enable 172. If CTOR Enable 172 is enabled (e.g., set to logical "1" in one embodiment), then the CTOR capability is supported. If CTOR Enable 172 is not enabled, then the configuration space 140 or 160 is not available, thereby providing backward capability to legacy PCIe systems.

The second byte of the CTOR control register 146 stores a 64-bit Address Enable 174 (e.g., two double words). If the 64-bit Address Enable is enabled (e.g., set to logical "1" in one embodiment), then the data structure of FIG. 8 is used, otherwise the data structure of FIG. 7 is used. The third, fourth and fifth bytes of the CTOR control register 146 define a FIFO Length 176 of the First In First Out (FIFO). The FIFO provides further configuration of the address space used to store Master ID and CTO address. In one embodiment, the ten bytes of the CTOR control register 146 are reserved.

Figure 10:
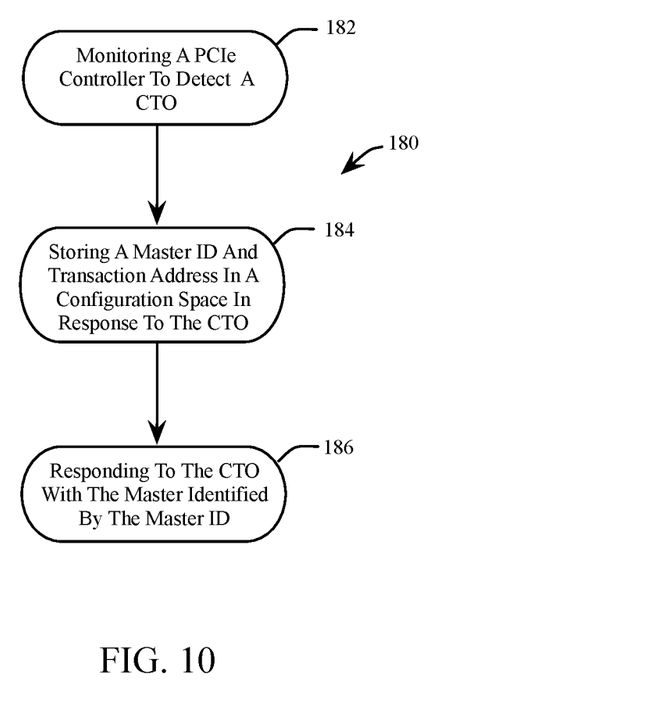
FIG. 10 is a flowchart representation of a method to retrieve transaction address resulting in PCIe completion timeout, in accordance with an embodiment of the present disclosure.

FIG. 10 shows an embodiment 180 of a method to retrieve transaction address resulting in PCIe completion timeout. With continued reference to FIG. 5 and FIG. 7, at 182 a PCIe controller 110 is monitored (e.g., with a Master 102) to detect a CTO 120. At 184, a Master ID 148 and a transaction address 152 are stored in a configuration space (e.g., the FIFO of the configuration space 140) in response to detecting the CTO 120. At 186, the Master 102 identified by the Master ID 148 responds to the CTO 120 (e.g., by terminating an application running on the Master 102 or avoiding an access associated with the transaction 152).

Figure 11:
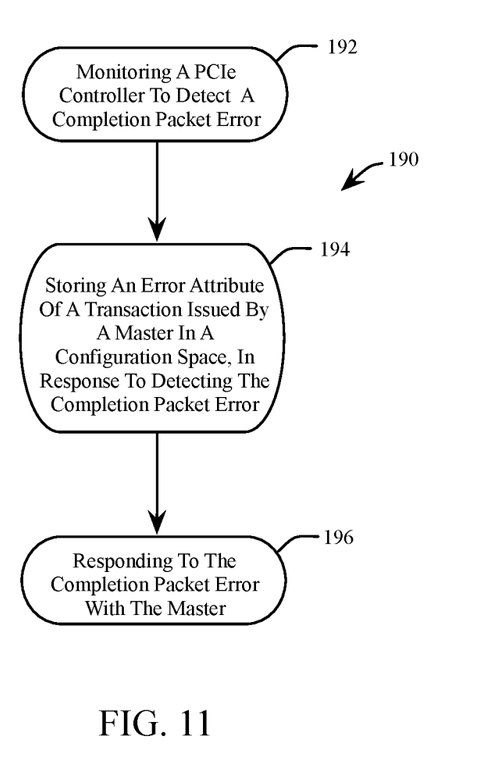
FIG. 11 is a flowchart representation of another method to retrieve transaction address resulting in PCIe completion timeout, in accordance with an embodiment of the present disclosure.

FIG. 11 shows an embodiment 190 of a method to retrieve transaction address resulting in PCIe completion packet error. With continued reference to FIG. 5 and FIG. 7, at 192 a PCIe controller 110 is monitored (e.g., with a Master 102) to detect a completion packet error. At 194, an error attribute of a transaction is stored in a configuration space (e.g., the FIFO of the configuration space 140) in response to detecting the completion packet error. At 196, the Master 102 identified by the Master ID 148 responds to the completion packet error (e.g., by terminating an application running on the Master 102 or avoiding an access associated with the transaction 152).

Figure 12:
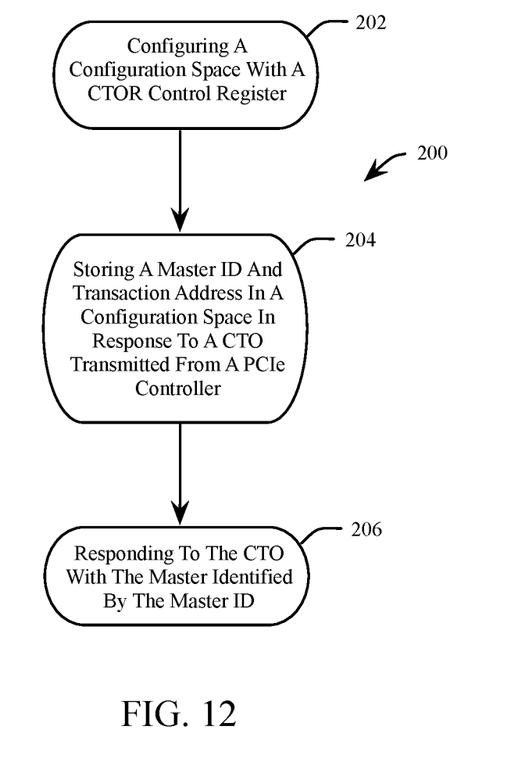
FIG. 12 is a flowchart representation of another method to retrieve transaction address resulting in PCIe completion timeout, in accordance with an embodiment of the present disclosure.

FIG. 12 shows an embodiment 200 of a method to retrieve transaction address resulting in PCIe completion timeout. With continued reference to FIG. 5 and FIG. 7, at 202 a configuration space 140 is configured with a CTOR control register 146. At 204, a Master ID 148 and a transaction address 152 are stored in a configuration space (e.g., the FIFO of the configuration space 140) in response to detecting the CTO 120 transmitted from a PCIe controller 110. At 206, the Master 102 identified by the Master ID 148 responds to the CTO 120 (e.g., by terminating an application running on the Master 102 or avoiding an access associated with the transaction 152).

As will be appreciated, at least some of the embodiments as disclosed include at least the following. In one embodiment, a method to retrieve transaction address resulting in PCIe completion timeout comprises monitoring a Peripheral Component Interconnect Express (PCIe) controller to detect a Completion Timeout (CTO) transmitted therefrom. A Master Identification (ID) of a Master and a transaction address of a transaction are stored in a configuration space, in response to detecting the CTO, wherein the transaction originates from the Master and the CTO is signaled in response to the transaction. The CTO is responded to with the Master identified by the Master ID in the configuration space.

Alternative embodiments of the method to retrieve transaction address resulting in PCIe completion timeout include one of the following features, or any combination thereof. The configuration space is configured by a Completion Timeout Reporting (CTOR) control register. The CTOR enables storing the Master ID and the transaction address in the configuration space by a setting of an enable bit of the CTOR. The CTOR configures a storage width of the transaction address in the configuration space by a setting of an address width bit of the CTOR. The CTOR configures a length of a First In First Out (FIFO) register in the configuration space by a setting of a plurality of FIFO length bits of the CTOR, wherein the FIFO register is configured to store a plurality of error attributes received from the PCIe controller. A plurality of error attributes are stored in the configuration space. The response comprises terminating an application of the Master, wherein the transaction issues from the application. The response comprises preventing further access to a memory space related to the transaction. The transaction is a non-posted transaction and the CTO is transmitted by the PCIe controller in response to the PCIe controller not receiving a completion packet after a time duration. Performing the response with the Master comprises performing the response with an Advanced Reduced Instruction Set Computer Machine (ARM) core.

In another embodiment, a method to retrieve transaction address resulting in PCIe completion packet error comprises monitoring a Peripheral Component Interconnect Express (PCIe) controller to detect a completion packet error transmitted therefrom. An error attribute of a transaction issued by a Master is stored in a configuration space, in response to detecting the CTO. The transaction is responded to with the Master.

Alternative embodiments of the method to retrieve transaction address resulting in PCIe completion packet error include one of the following features, or any combination thereof. The error attributes comprise a Master Identification (ID) of the Master and a transaction address of the transaction. The configuration space is configured by a Completion Timeout Reporting (CTOR) control register. The response comprises terminating an application of the Master, wherein the transaction issues from the application. The response comprises preventing further access to a memory space related to the transaction.

In another embodiment, a method to retrieve transaction address resulting in PCIe completion timeout comprises configuring a configuration space with a Completion Timeout Reporting (CTOR) control register. A Master Identification (ID) of a Master and a transaction address of a transaction are stored in a configuration space, in response to detecting a Completion Timeout (CTO) transmitted from a Peripheral Component Interconnect Express (PCIe) controller, wherein the transaction originates from the Master. The transaction is responded to with the Master identified by the Master ID in the configuration space.

Alternative embodiments of the method to retrieve transaction address resulting in PCIe completion timeout include one of the following features, or any combination thereof. The CTOR enables storing the Master ID and the transaction address in the configuration space by a setting of an enable bit of the CTOR. The CTOR configures a storage width of the transaction address in the configuration space by a setting of an address width bit of the CTOR. The CTOR configures a length of a First In First Out (FIFO) register in the configuration space by a setting of a plurality of FIFO length bits of the CTOR, wherein the FIFO register is configured to store a plurality of error attributes received from the PCIe controller. The transaction is a non-posted transaction and the CTO is transmitted by the PCIe controller in response to the PCIe controller not receiving a completion packet after a time duration.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method to retrieve a transaction address of a transaction resulting in Peripheral Component Interconnect Express (PCIe) completion timeout comprising:
   monitoring a PCIe controller to detect a Completion Timeout (CTO) transmitted therefrom;
   storing in a configuration space, a Master Identification (ID) of a Master and the transaction address of the transaction, in response to detecting the CTO, wherein the transaction originates from the Master and the CTO is signaled in response to the transaction, wherein the configuration space is configured by a Completion Timeout Reporting (CTOR) control register, and the CTOR control register configures at least one of:
   a storage width of the transaction address in the configuration space by a setting of an address width bit of the CTOR, or
   a length of a First In First Out (FIFO) register in the configuration space by a setting of a plurality of FIFO length bits of the CTOR, wherein the FIFO register is configured to store a plurality of error attributes received from the PCIe controller; and
   responding to the CTO with the Master identified by the Master ID in the configuration space.

2. The method of claim 1 wherein the configuration space is configured by a Completion Timeout Reporting (CTOR) control register.

3. The method of claim 2 wherein the CTOR enables storing the Master ID and the transaction address in the configuration space by a setting of an enable bit of the CTOR.

4. The method of claim 2 wherein the CTOR configures a storage width of the transaction address in the configuration space by a setting of an address width bit of the CTOR.

5. The method of claim 2 wherein the CTOR configures a length of a First In First Out (FIFO) register in the configuration space by a setting of a plurality of FIFO length bits of the CTOR, wherein the FIFO register is configured to store a plurality of error attributes received from the PCIe controller.

6. The method of claim 1 further comprising storing a plurality of error attributes in the configuration space.

7. The method of claim 1 wherein the response comprises terminating an application of the Master, wherein the transaction issues from the application.

8. The method of claim 1 wherein the response comprises preventing further access to a memory space related to the transaction.

9. The method of claim 1 wherein the transaction is a non-posted transaction and the CTO is transmitted by the PCIe controller in response to the PCIe controller not receiving a completion packet after a time duration.

10. The method of claim 1 wherein performing the response with the Master comprises performing the response with an Advanced Reduced Instruction Set Computer Machine (ARM) core.

11. A method to retrieve a transaction address resulting in Peripheral Component Interconnect Express (PCIe) completion packet error comprising:
monitoring a PCIe controller to detect a completion packet error transmitted therefrom;
storing in a configuration space, an error attribute of a transaction issued by a Master, in response to detecting the completion packet error, wherein the configuration space is configured by a Completion Timeout Reporting (CTOR) control register, wherein the CTOR control register configures at least one of:
a storage width of the transaction address in the configuration space by a setting of an address width bit of the CTOR, or
a length of a First In First Out (FIFO) register in the configuration space by a setting of a plurality of FIFO length bits of the CTOR, wherein the FIFO register is configured to store a plurality of error attributes received from the PCIe controller; and
responding to the completion packet error with the Master.

12. The method of claim 11 wherein the error attribute comprises a Master Identification (ID) of the Master and a transaction address of the transaction.

13. The method of claim 11 wherein the configuration space is configured by a Completion Timeout Reporting (CTOR) control register.

14. The method of claim 11 wherein the response comprises terminating an application of the Master, wherein the transaction issues from the application.

15. The method of claim 11 wherein the response comprises preventing further access to a memory space related to the transaction.

16. A method to retrieve a transaction address of a transaction resulting in Peripheral Component Interconnect Express (PCIe) completion timeout comprising:
configuring a configuration space with a Completion Timeout Reporting (CTOR) control register;
storing in the configuration space, a Master Identification (ID) of a Master and the transaction address of the transaction, in response to detecting a Completion Timeout (CTO) transmitted from a PCIe controller, wherein the transaction originates from the Master, and wherein the CTOR control register configures at least one of:
a storage width of the transaction address in the configuration space by a setting of an address width bit of the CTOR, or
a length of a First In First Out (FIFO) register in the configuration space by a setting of a plurality of FIFO length bits of the CTOR, wherein the FIFO register is configured to store a plurality of error attributes received from the PCIe controller; and
responding to the transaction with the Master identified by the Master ID in the configuration space.

17. The method of claim 16 wherein the CTOR enables storing the Master ID and the transaction address in the configuration space by a setting of an enable bit of the CTOR.

18. The method of claim 16 wherein the CTOR configures a storage width of the transaction address in the configuration space by a setting of an address width bit of the CTOR.

19. The method of claim 16 wherein the CTOR configures a length of a First In First Out (FIFO) register in the configuration space by a setting of a plurality of FIFO length bits of the CTOR, wherein the FIFO register is configured to store a plurality of error attributes received from the PCIe controller.

20. The method of claim 16 wherein the transaction is a non-posted transaction and the CTO is transmitted by the PCIe controller in response to the PCIe controller not receiving a completion packet after a time duration.

* * * * *